June 1, 1943.  W. A. ANDERSON  2,320,399
COMPUTING MACHINE
Filed June 26, 1940   3 Sheets-Sheet 1

INVENTOR
WALTER A. ANDERSON
BY
ATTORNEY

June 1, 1943.  W. A. ANDERSON  2,320,399
COMPUTING MACHINE
Filed June 26, 1940  3 Sheets-Sheet 2
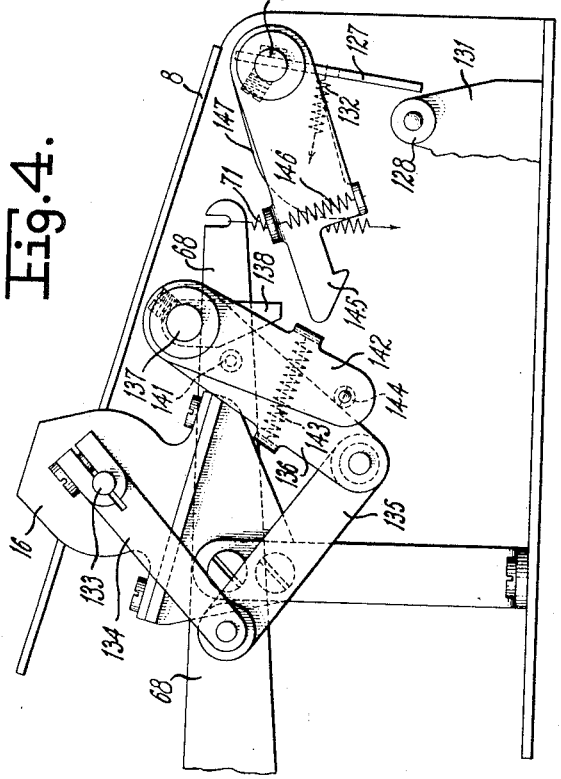
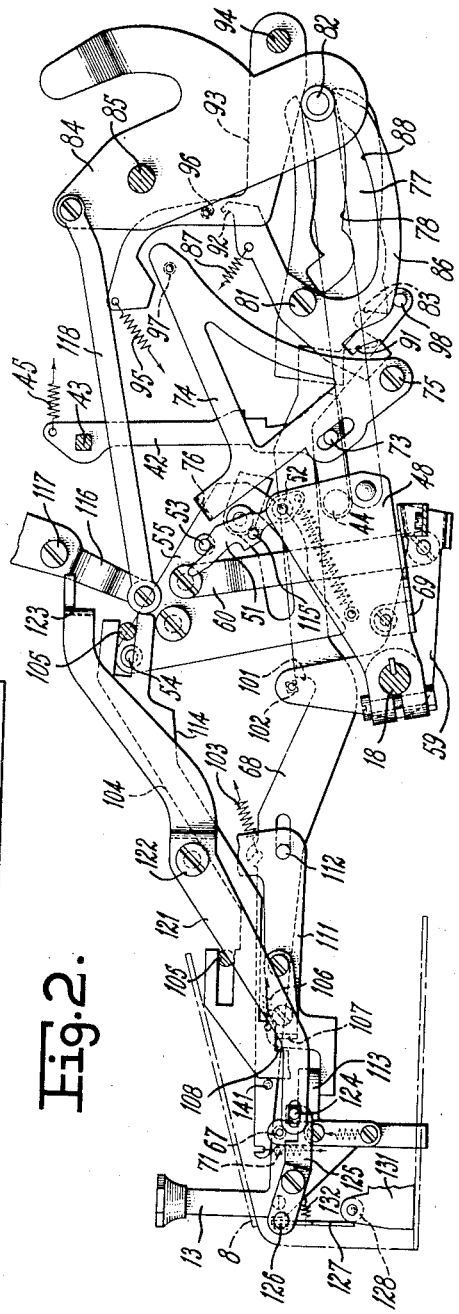
INVENTOR
WALTER A. ANDERSON
BY
*L. G. Julihn*
ATTORNEY

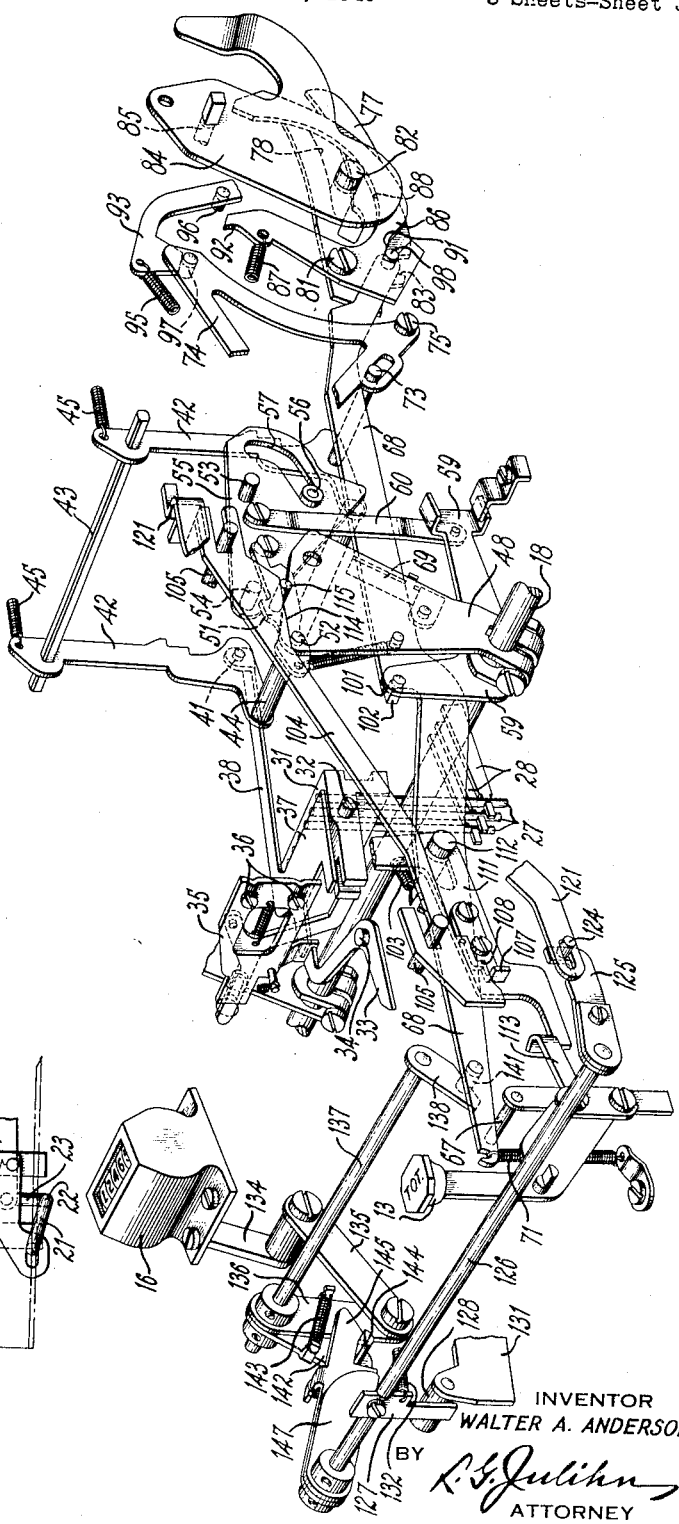

Patented June 1, 1943

2,320,399

UNITED STATES PATENT OFFICE 2,320,399

COMPUTING MACHINE

Walter A. Anderson, Bridgeport, Conn., assignor to Underwood Elliott Fisher Company, New York, N. Y., a corporation of Delaware Application June 26, 1940, Serial No. 342,544

1 Claim. (Cl. 235—60)

This invention relates to adding machines, and more particularly to machines of this class that are used in merchandising transactions and the like.

Generally these machines record individual purchases, together with the totals thereof, upon a slip that is handed to the customer as a record of the transaction. It is desirable on such machines to have a registered count of the number of such completed sales or transactions made within a given period. These machines are generally equipped with a motor bar and total key, both of which are adapted to cycle the machine, the motor bar being used to cycle the machine following the indexing of items upon the amount keys to cause the items to be printed on the slip and accumulated in a totalizer, and the total key being used to cycle the machine to print the total and clear the totalizer following the printing and accumulation of a group of items. There is a possibility that following the indexing of an item, the operator might strike the total key instead of the motor bar. This would cause the item to be printed without being accumulated in the totalizer, and result in an erroneous total of the items listed upon the slip.

It is an object of the present invention, therefore, to provide a means that positively insures accumulation in the totalizer of all items indexed on the amount keys whether the machine is operated by the total key or the customary motor bar.

Another object of the invention is to provide a machine of this character with a simple and effective means for counting the number of totals, and that is operable to count "1" only upon the totaling of a transaction.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

In the drawings:

Figure 1 is a perspective view of an adding machine on which the invention is adapted to be used, Figure 2 is a right side elevation of the machine embodying the features of my invention, the parts being shown in normal position, Figure 3 is a perspective view generally similar to Figure 2 but with the mechanism occupying an intermediate position, in the course of an operation, Figure 4 is a right side elevation of the total counter, together with certain of the parts used for the operation thereof, Figure 5 is a fragmental right side elevation of the totalizer, together with certain of its control mechanism, Figure 6 is a detail right side elevation showing the connection between the total key and the motor bar, and Figure 7 is a detail perspective of a blank cycle control detent.

The invention is shown as applied to a machine of the character disclosed in U. S. Patents Nos. 1,198,487; 1,583,102; 1,724,231; 1,925,735; 1,934,747; 1,965,611 and 2,068,650.

GENERAL DESCRIPTION

This is an improvement on machines disclosed in the above-enumerated patents. The machine is adapted to be mounted on a cash drawer, and is equipped with a keyboard including amount keys for indexing the amounts of items to be added, a motor bar for cycling the machine to add the amounts in the totalizer, and a total key for cycling the machine to print the totals of the accumulated amounts. It is provided with the usual paper carriage that supports a tally roll arranged to be line space advanced incident to each operation of the machine around a roller platen mounted in the carriage. Type bars are provided for printing the item amounts and the totals upon the tally. A plate having a serrated edge is mounted on the carriage to facilitate the tearing of the completed slip of recorded transactions. A total counter is provided on the left of the keyboard to count "1" for each total taken. It is so constructed that it will count only "1" even though the total key should be held down to permit cycling of the machine after the total is printed.

In the ordinary course of operations, an item amount is indexed on the amount keys and the motor bar depressed to cycle the machine. During this operation, the type bars rise to print the amount of the item and then return to normal position. During the ascent of the type bars, the totalizer is disengaged from actuation racks carried by the type bars, but just prior to the descent of the bars, the totalizer is re-engaged with the racks so that the amount printed is accumulated thereon.

When all of the items that are to be added in a given transaction have been accumulated, the operator depresses the motor bar to initiate what is known as a blank cycle to condition the machine for taking a total. The total key is then depressed, and, through its connection with the motor bar, initiates a total cycle. During this cycle of the machine, the totalizer remains engaged with the actuating racks during the ascent of the type bars, and is disengaged from the racks just prior to the descent of the bars, leaving the totalizer cleared in readiness for the next group of accumulating operations.

Although normal operations of the machine are performed as outlined above, i. e., operation of the motor bar following the indexing of an item will cause the item to be added on the totalizer, and operation of the total key following a completed item entering operation will cause a total to be taken from the totalizer, mechanism is provided whereby operation of the total key instead of the motor bar following the indexing of an item will also cause such indexed item to be accumulated on the totalizer.

DETAILED DESCRIPTION

*Index of topics*

Figure 1:
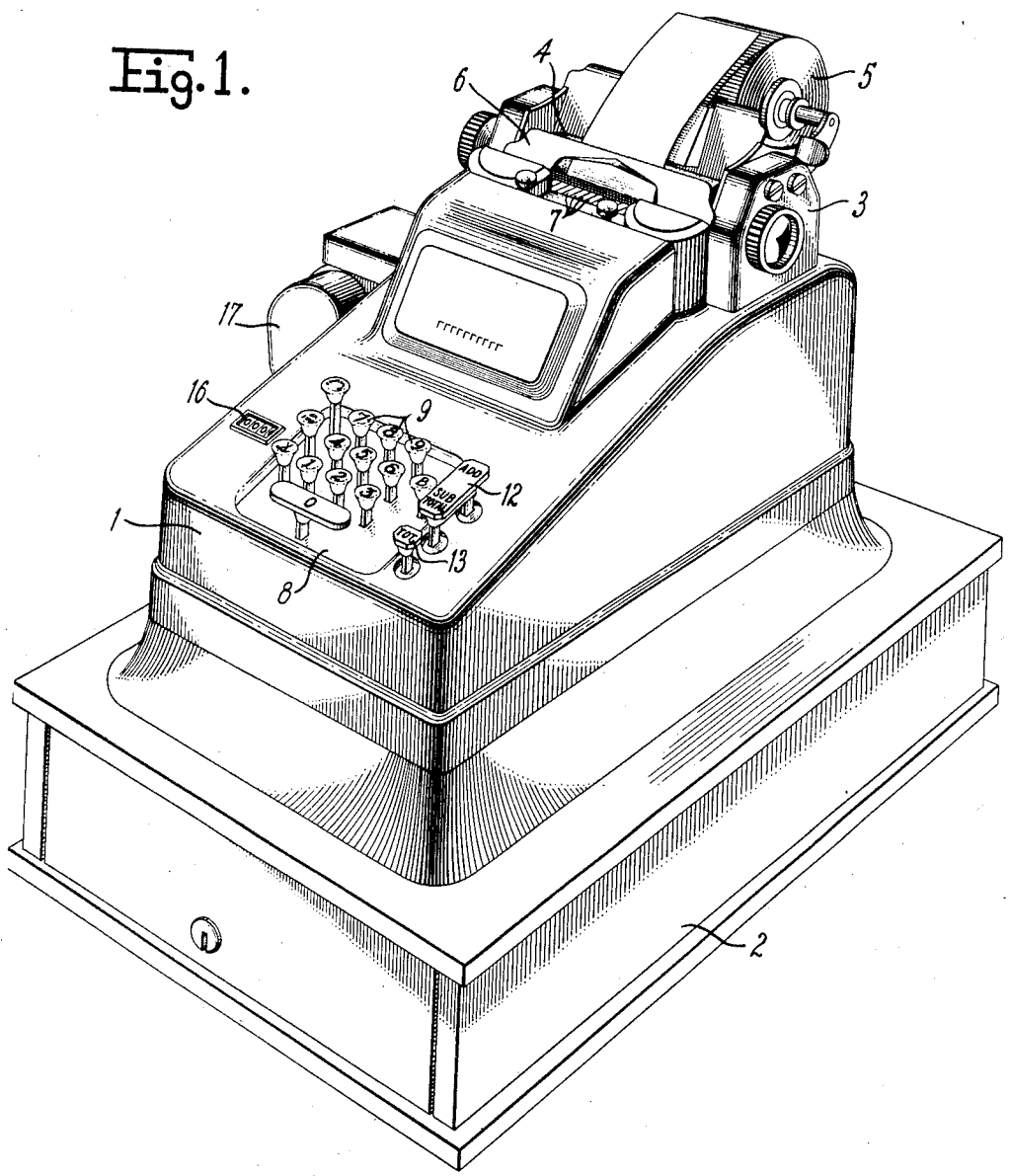

1. The machine sections and operating mechanism.
2. Indexing, differential and printing mechanism.
3. Totalizer engaging and disengaging mechanism.
4. Adding an item.
5. Means of enforcing a blank cycle before taking a total.
6. Taking a total.
7. Means for preventing non-addition of items.
8. Counting totals.

1. THE MACHINE SECTIONS AND OPERATING MECHANISM

Referring to Figure 1, the reference numeral 1 indicates the machine generally, mounted upon a cash drawer 2. The machine is equipped with the usual carriage 3 having a platen 4 arranged to line space advance the paper during each machine cycle, from a tally roll supply 5 that is supported on the carriage. A plate 6, serrated along its upper edge, is mounted on the carriage to facilitate tearing of completed sales slips. The machine also has the customary type bars 7, keyboard 8 including amount keys 9, motor bar 12 and total key 13. A totalizer 14 (Figure 5) comprised of a plurality of twenty tooth wheels and operable by actuating racks 15 suspended from type bars 7, is arranged to add items indexed upon amount keys 9. The totalizer is conditioned by total key 13 for taking totals of the added amounts, and a counter 16 (Figure 1), mounted to the left of the amount keys and viewed through an aperture in the machine housing, is adapted to count the totals and thereby register the number of completed transactions.

The machine is operated by an electric motor 17. The motor is started by the closing of a suitable switch mechanism and is coupled with an actuating shaft 18 (Figures 2 and 3) by a suitable clutch mechanism upon depression of either motor bar 12 or total key 13. As shown in Figure 6, motor bar 12 carries a slide 20 pivoted to an arm 21 of a rod 22 extending across the front of the machine. An upwardly directed arm 23 of rod 22 is connected to a link 24 extending to the rear of the machine, where it controls the closing and opening of the switch and engagement and disengagement of the clutch, as above described. The connections of link 24 with the switch and clutch mechanism are disclosed in Patent No. 1,925,735. An arm 25 pivoted on slide 20 is yieldingly held in contact with a pin 26 fixed on total key 13, so that depression of this key also operates slide 20 to initiate a machine cycle.

Operation of the motor causes drive shaft 18 to oscillate counter-clockwise, then clockwise (Figures 2 and 3), once during each machine cycle.

2. INDEXING, DIFFERENTIAL AND PRINTING MECHANISMS

The above mechanisms are identical with those disclosed in the hereinbefore enumerated patents, so that the explanation thereof will be only general.

Item amounts to be entered in the machine are indexed on the amount keys 9 which set horizontally disposed stops (not shown) into the path of a series of rods such as 27 (Figures 3 and 5). Rods 27 are connected at their lower ends to arms such as 28 pivoted to type bars 7 mounted for vertical movement in the machine. Rods 27 are guided in a frame 31 that is slidable along a rod 32 from left to right in the machine. A series of type carried by each type bar co-operate with platen 4 to print amounts and totals, a series of hammers similar to those disclosed in the above-mentioned patents being provided to effect printing. The type bars 7 and actuating racks 15 suspended therefrom are suitably arranged to be raised and lowered during each cycle of the machine by mechanism such as that fully disclosed in Patent No. 1,965,611.

As the amount keys are depressed, a suitable escapement causes frame 31 to move from left to right (Figure 3) one step for each amount key depressed, placing rods 27, one at a time, beneath the stops that have been set by the amount keys.

In the indexing of an item, as the first amount key is depressed, a suitable connection moves a lever 33 (Figure 3) clockwise about its pivot 34 to move a plate 35 toward the rear (as viewed in Figure 3) a slight extent about its pivot 36. Movement of plate 35 rearwardly, moves the forward end 37 of a plate 38 rearwardly in the machine. The rear end of plate 38 is pivoted at 41 to a frame 42 composed of two similar members, one on each side of the machine, pivoted on a rod 43 and connected by a rod 44 for uniform movement. A pair of springs 45 connected to the upper ends of the frame members tend to move plate 38 forward, but are prevented, by a spring detent 46 (Figure 7), from doing so after it is moved rearwardly by plate 35.

Rearward movement of plate 38 places the end 37 (Figure 3) above rods 27, so that during the printing of an item, only the rods that are moved to the right of the plate are permitted to rise during the machine cycle. In this manner, only the type bars necessary to print the digits of an indexed number are allowed to rise from their zero positions.

3. TOTALIZER ENGAGING AND DISENGAGING MECHANISM

To engage and disengage the totalizer with actuating racks 15, a shaft 47 (Figure 5), upon which the totalizer wheels are mounted, is moved forwardly and rearwardly in the machine (left and right, Figure 5). To shift the totalizer in this manner, an arm 48 (Figures 2 and 3) connected with actuating shaft 18 carries a pawl 51 pivoted at 52 on the arm. This pawl engages studs 53 and 54 on the initial and return strokes of the actuating shaft to oscillate a plate 55 carrying studs 53 and 54 first counter-clockwise, then clockwise during each machine cycle.

Oscillation of plate 55 moves a stud 56 (Figure 5) embraced by a cam slot 57 in plate 55, and a link 58 to the left and then to the right, stud 56 being carried by an arm 61 pivoted at 62 and connecting the forward end of link 58 with arm 61. Link 58 at its rear end has a notch engaging a stud 63 on one of two similar levers 64 secured to a shaft 65 journaled in the machine frame. Two identical links 66 connect levers 64 with shaft 47. When the machine is cycled to add an item, movement of link 58 to the left, at the beginning of an operation, moves the totalizer from the position shown in Figure 5, where it is engaged with racks 15, a slight distance to the left to a position where it is disengaged from the racks. Movement of link 58 to the right at the beginning of the second half of the cycle returns the totalizer to the position shown in Figure 5.

The same parts are used for engaging and disengaging the totalizer with the actuating racks for taking totals, with the exception, however, that a bell crank 59, loosely pivoted on drive shaft 18, cooperates with a link 60 connected between one arm of the bell crank and plate 55 to disengage the totalizer at the beginning of the second half of the cycle, and a flange 69 secured to arm 48 cooperates with the horizontal arm of bell crank 59 to engage the totalizer at the end of the operation, as will be explained in detail later.

4. ADDING AN ITEM

To add an item, the item is indexed on the amount keys 9 and the motor bar depressed. Oscillation of drive shaft 18 (Figure 2), through pawl 51 and stud 53, disengages the totalizer from the actuating racks. During the remainder of the first half of the cycle, type bars 7 (Figure 5) rise differentially until their rods 27 abut the stops (not shown) that are differentially set incident to the indexing of an item on the amount keys 9, actuating racks 15 rising with the type bars.

At the beginning of the last half of the cycle, pawl 51 engages stud 54, returning plate 55, link 58, lever 64, link 66 and the totalizer to their positions shown in Figure 5, where it is engaged with racks 15. During the remainder of the last half of the cycle, the type bars and actuating racks are lowered in the usual manner, entering on the totalizer the amount indexed on the keyboard.

5. MEANS OF ENFORCING A BLANK CYCLE BEFORE TAKING A TOTAL

Mechanism similar to that shown in Patent No. 1,583,102 is provided on this machine to enforce a blank cycle before a total can be taken, so that any of the parts of the customary transfer mechanism employed on machines of this type, that were tripped during the last accumulating operation, will be restored.

To do this, it is only necessary to hold all the rods 27 (Figure 3) against rising during the cycle. This is accomplished by leaving the end 37 of plate 38 at the end of an accumulating operation in its rear position where it overlies rods 27, it being remembered that depression of the first amount keys in indexing an amount moves plates 25 and 38 into their rear positions. With plate 38 in its rear position, if no amount keys are depressed, all the rods 27 lie under the plate, so that during operation of the machine, the type bars are held from rising. During such a blank operation, as explained in Patent No. 1,583,102, plate 38 is moved forwardly to its position shown in Figure 3, so that a total can be taken in the following operation.

6. TAKING A TOTAL

In taking a total, the total key 13 is depressed. Depression of this key, through its connection with motor bar 12 (Figure 6) as before described, initiates a machine cycle.

Depression of total key 13 withdraws a stud 67, connected thereto, from its position directly beneath a lever 68 (Figure 2), and stretches a spring 71 connected between lever 68 and the machine frame.

Movement of plate 38 forwardly to its position shown in Figure 3, during the preceding blank cycle, moved frame 42 forward with it. Forward movement of the frame from the position shown in Figure 2 to that shown in Figure 3, through a pin 73 fixed in the frame, moved a lever 74 counter-clockwise about its pivot 75 by reason of the end of pin 73 lying within a slot in lever 74. This movement of lever 74 causes a flange 76 thereon (Figure 2) to strike pawl 51, and move it sufficiently to prevent it from cooperating with stud 53 at the beginning of the total taking operation. Therefore, the totalizer remains engaged with the actuating racks during the first portion of the operation, allowing the actuating racks and type bars to be moved differentially under control of the totalizer wheels.

To disengage the totalizer after the wheels are returned to zero by the differential upward movement of the racks, the following mechanism is provided to move plate 55 counter-clockwise by counter-clockwise movement of bell crank 59 as mentioned above, at the beginning of the second half of the total taking cycle.

A cam lever 77 pivoted at 81 has a slot 78 that embraces a rod 82 and is provided on its lower edge with a notch 83 (Figure 3). Rod 82 is fixed in an arm 84 pivoted at 85, that is arranged, through suitable connections with actuating shaft 18, to be rocked first clockwise, and then counter-clockwise about pivot 85 during each cycle of the machine. Another cam lever 86 also is pivoted at 81 and is tensioned counter-clockwise by a spring 87. Lever 86 has a cam edge 88 that bears against the lower side of rod 82, under the tension of spring 87, and has a short cam slot 91 in its lower edge, and a hook 92 at its upper end. A lever 93 (Figure 2) is pivoted on a rod 94 and is tensioned counter-clockwise by a spring 95, the counter-clockwise movement of the lever being controlled by rod 82 upon which the lower edge of the lever rests. Lever 93 carries a stud 96 which normally lies out of the path of hook 92.

During accumulating operations and during the blank cycle preceding a total taking cycle, in other words, during the operations in which frame 42 is in its rear position, as shown in Figure 2, a stud 97 on lever 74 lies in its rear position shown in Figure 2. During these operations, the forward movement of rod 82, during the first half of the machine cycle, allows lever 93 to move a sufficient distance counter-clockwise to bring stud 96 into the path of hook 92. Then upon rod 82 reaching its forward extremity, where it moves lever 77 counter-clockwise, because of the configuration of the left end of cam slot 78, notch 83 is placed directly above a stud 98 secured to the rear end of lever 68 and resting on the lower edge of lever 86. However, since stud 96 is in the path of hook 92, lever 86 is held against any substantial counter-clockwise movement from its position shown in Figure 2. Stud 98, therefore, does not rise into notch 83, but remains held in its lowered position by lever 86. Lever 68 is thereby held against operation during these cycles even though total key 13 is depressed, to tension spring 71 and thereby tension lever 68 counter-clockwise.

During a total taking operation, however, frame 42 and lever 74 are in their forward positions (Figure 3) where stud 97 lies directly under the forward end of lever 93. Therefore, as soon as rod 82 begins its forward movement, lever 86 begins moving counter-clockwise, and since the total key 13 is depressed, spring 71 is stretched, tensioning stud 98 upwardly toward the lower edge of lever 77. As rod 82 completes its forward movement, lever 77 moves counter-clockwise, as mentioned above, placing notch 83 above stud 98. Since lever 86 has moved counter-clockwise, stud 98 is permitted to rise into notch 83, whereupon further counter-clockwise movement of lever 86 moves slot 91 therein into engagement with stud 98, locking the stud in notch 83, as shown in Figure 3. This rising of stud 98 is accompanied by a sufficient rising of the rear portion of lever 68 to place a shoulder 101 thereon immediately behind a stud 102 on bell crank 59.

During the first part of the return movement of shaft 18, rod 82 moves lever 77 clockwise to its position shown in Figure 3, moving stud 98 and lever 68 forwardly. This causes shoulder 101 to move stud 102 and rock bell crank 59 counter-clockwise which in turn, through link connection 60, moves plate 55 counter-clockwise, as desired, to disengage the totalizer from the actuating racks before they are lowered to their normal positions, shown in Figure 5. The totalizer now stands at zero. During the remainder of the return movement of shaft 18, rod 82 is moved to the rear, moving lever 86 clockwise to its position shown in Figure 2. This cams stud 98 downwardly out of notch 83, whereupon a spring 103, connected to lever 68, pulls the lever and stud 98 to the rear to their positions shown in Figure 2. During the last portion of the return movement of shaft 18, flange 69 strikes the horizontal arm of bell crank 59, and moves the bell crank clockwise, moving plate 55 clockwise to its position shown in Figures 2 and 5, leaving the totalizer engaged with the actuating racks at the end of the operation.

The following parts are provided to hold pawl 51 away from stud 54 during total taking operations so that plate 55 may be rocked counter-clockwise by bell crank 59 and link 60 as just described. A slide 104 (Figures 2 and 3) is mounted on studs 105 for movement forwardly and rearwardly of the machine (left and right in Figures 2 and 3). The slide is normally urged toward the right by a spring 106, but is prevented from moving to its extreme rearward (right) position by a flange 107 that engages a shoulder 108 formed on the slide. Flange 107 is secured on a lever 111 pivoted at 112, the forward end of which underlies an extension 113 on the stem of total key 13. The right end of the slide has a cam surface 114. Upon depression of total key 13, extension 113 rocks lever 111, withdrawing flange 107 from the path of movement of shoulder 108 and allowing the slide 104 to move to its rearmost position, as shown in Figure 3. In this position, cam surface 114 engages a pin 115 on pawl 51, and prevents the pawl from cooperating with stud 54, so that plate 55 is solely under the control of bell crank 59 and link 60 during the second portion of a total taking operation.

Upon the completion of the operation, an arm 116 (Figure 2) pivoted at 117 and connected by a link 118 to arm 84 for oscillation therewith, engages the right end of slide 104 on the clockwise stroke of its oscillation and thrusts the slide toward the left, whereupon flange 107 is again raised into the path of shoulder 108 by suitable spring tension upon lever 111.

7. MEANS FOR PREVENTING NON-ADDITION OF ITEMS

In machines of the type illustrated in the drawings, but not provided with the present improvement, if the operator should strike the total key instead of the motor bar following the indexing of an item, the machine would execute a cycle because of the above described connections between the total key and the motor bar. During this cycle, totalizer 14 would be disengaged from the racks during the first portion of the cycle, and the amount indexed would be printed but non-added on the totalizer, because the rearward movement of slide 104 incident to operation of the total key placed cam surface 114 in effective position, preventing re-engagement of the totalizer with racks 15 prior to the second or adding portion of the cycle.

The following parts are provided to insure the addition of such items even though the total key is so misoperated. A lock lever 121 (Figure 2), pivoted on a stud 122, has a flange 123 lying above the right end of slide 104, and is connected by a pin-and-slot connection 124 at its left end to an arm 125 fixed on a rod 126 journaled in the machine frame (see also Fig. 3). A depending finger 127 fixed on rod 126 lies in front of a roller 128 carried by a slide 131, a spring 132 tensioning finger 127 against roller 128. Slide 131 corresponds to the slide bar 72 in Patent No. 1,198,487, and is operable as disclosed in that patent to advance step by step toward the right, as viewed in Figures 2 and 3, and toward the left, as viewed in Figure 4, incident to digit-by-digit indexing of a number on amount keys 9. The slide is also operable, as explained in that patent, to restore from any such advanced position to its normal position shown in Figures 2 and 3, upon the completion of a machine operation.

As the first digit of an item is indexed in the keyboard, slide 131 advances one step of movement toward the right, as viewed in Figures 2 and 3, and finger 127, following the roller 128 under tension of spring 132, rocks shaft 126, which in turn, by pin-and-slot connection 124, rocks lever 121 clockwise, lowering flange 123 into the path of movement of slide 104. In such position, flange 123 locks slide 104 in its forward or left position, preventing cam surface 114 from being moved into effective position with respect to pawl 51. Hence, even though total key 13 is struck following the indexing of an item on the keyboard, the item will be added in the totalizer.

Upon completion of the cycle, as slide 131 is restored to normal position, roller 128 strikes finger 127, rocking flange 123 upwardly out of the path of movement of slide 104 to the position shown in Figure 2. Lock lever 121 remains in ineffective position during totaling operations;

since during the blank cycle preceding such operation no item is indexed upon the keyboard, and hence, slide 131 remains in normal position, i. e., holding lever 121 ineffective against the tension exerted by spring 132.

8. COUNTING TOTALS

A counter 16, suitably mounted in the machine frame to the left of keyboard 8, is viewed through an aperture in the machine housing (Figure 1) and is provided to count the number of totals taken. This counter is of the well-known "Veeder" type, comprised of a series of pinions arranged for step-by-step counting incident to oscillation of an actuating shaft 133 (Figure 4). An arm 134 (Figures 3 and 4) fixed on the shaft is connected by a link 135 to an arm 136 loosely mounted on a rod 137 journaled in the machine frame. An arm 142 fixed on rod 137 adjacent arm 136 is yieldingly connected to arm 136 by a spring 143. Arm 142 carries a stud 144 engageable by a latch 145 loosely mounted on shaft 126 and yieldingly connected by a spring 146 to an arm 147 fixed on shaft 126 adjacent the latch.

Upon indexing an item on amount keys 9, as slide 131 moves away from finger 127 as shown in Figure 4, latch 145 is raised under tension of spring 132 to release stud 144. Thereupon, arm 134 swings counter-clockwise, as viewed in Figure 3, under the tension of a restoring spring (not shown) within the counter, to the position shown in Figure 4. Arm 134 remains in this position until the taking of a total. A depending finger 138 fixed on rod 137 lies in front of a pin 141 carried by lever 68. When lever 68 moves forward during a total taking operation as described in a preceding section, pin 141 rocks finger 138 clockwise, as viewed in Figure 3, rocking arm 134 clockwise to effect a count of "1" in the counter. Incident to this clockwise movement of arm 134, stud 144 is again engaged by latch 145, the latch now being in its lower effective position since no item has been indexed on the keyboard. Arm 134 remains held by the latch against the restoring action of the counter-spring until the next item is indexed on the keyboard, and so on.

By this arrangement, a count of "1" will only be effected upon the taking of a total, irrespective of the number of times total key 13 may be depressed following the taking of that total.

The yielding connection between arms 136 and 142 prevents overthrow of arm 134 incident to forward thrust of lever 68, and the yielding connection between latch 145 and arm 147 permits stud 144 to enter the confines of the latch when the latter is in its lower or effective position.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claim which follows.

What is claimed is:

In a machine of the class described, amount keys, a total key, a totalizer, actuating racks, means to engage and disengage the totalizer with the actuating racks for item entering and total taking, a connection from the total key to the engaging means to control the operation of the engaging means during total taking operations, and a connection between the amount keys and the first mentioned connection to render the first mentioned connection ineffective upon operation of an amount key.

WALTER A. ANDERSON.